UNITED STATES PATENT OFFICE.

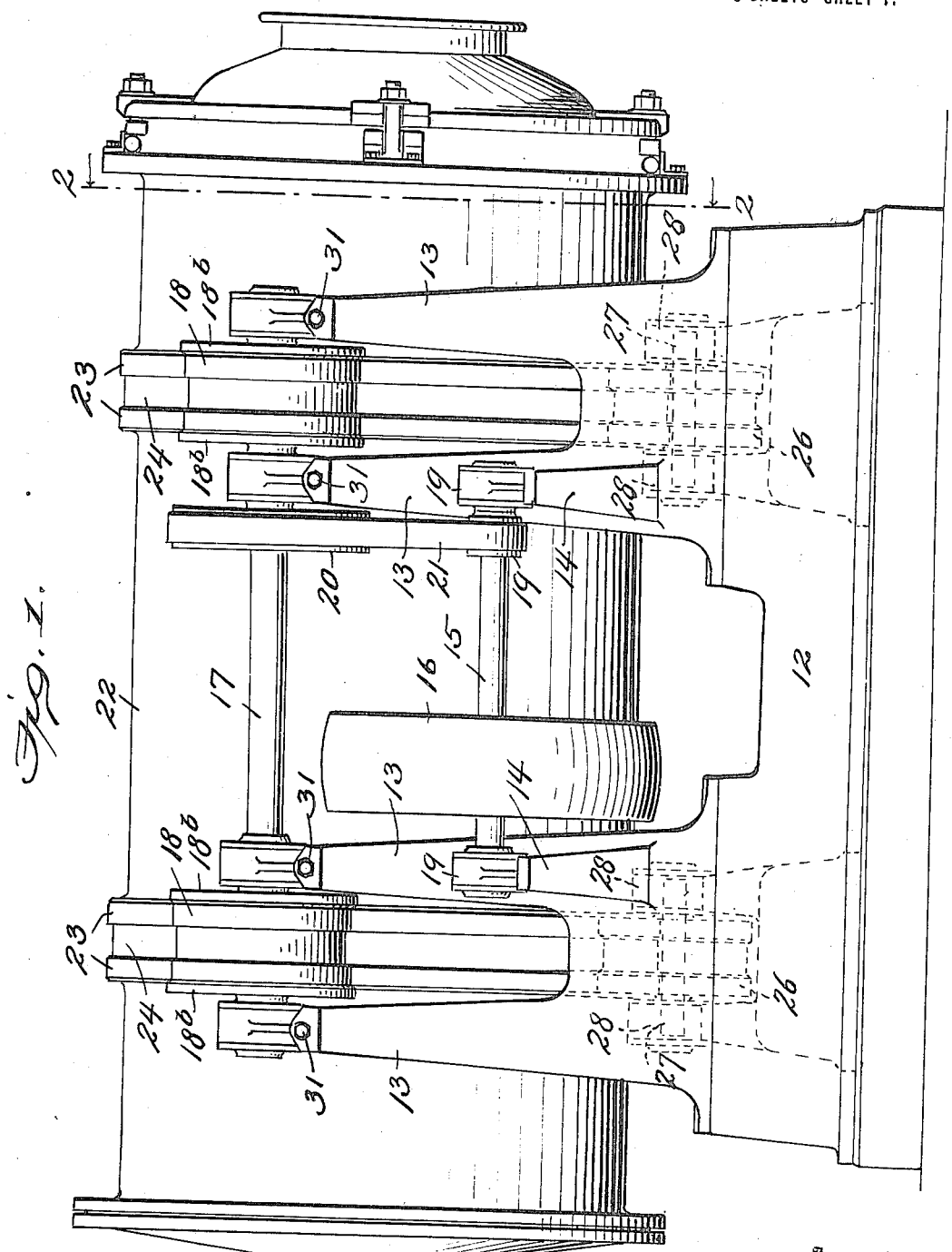

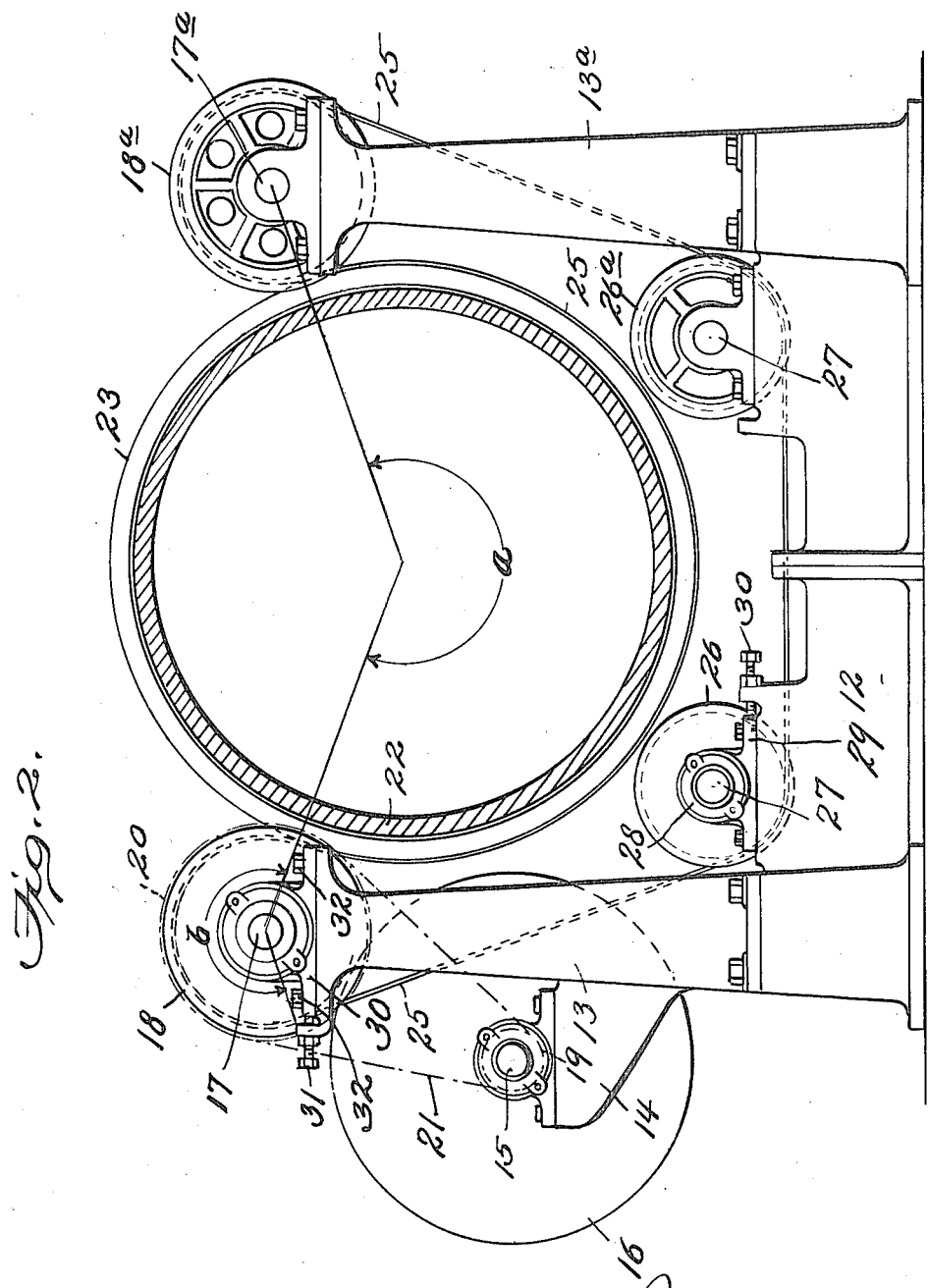

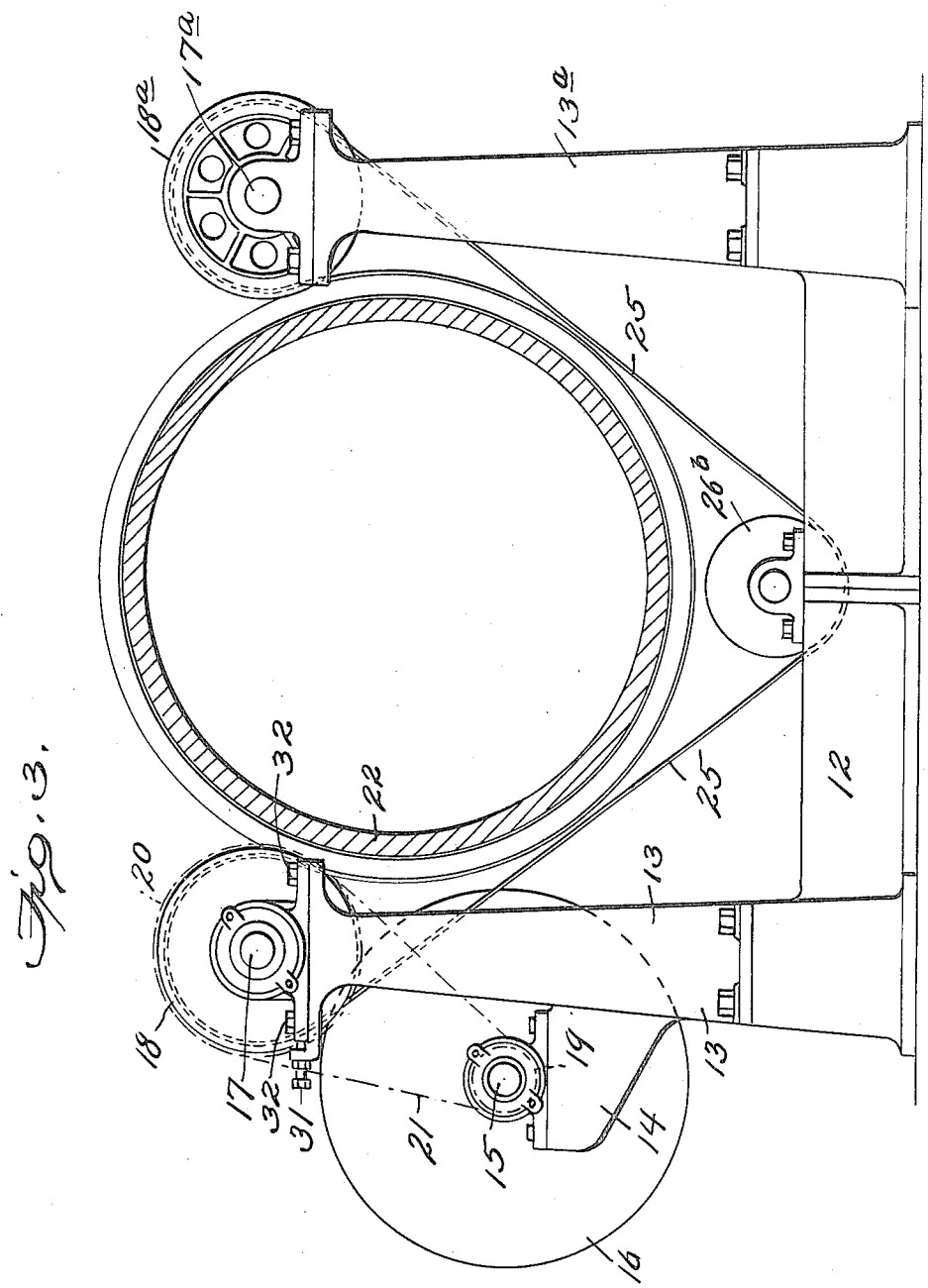

JULIUS G. BERGMAN, OF EL PASO, TEXAS.

TUBE-MILL.

1,280,375.  Specification of Letters Patent.  Patented Oct. 1, 1918.

Application filed January 10, 1918. Serial No. 211,218.

*To all whom it may concern:*

Be it known that I, JULIUS G. BERGMAN, a citizen of the United States, residing at El Paso, in the county of El Paso and State of Texas, have invented or discovered certain new and useful Improvements in Tube-Mills, of which the following is a specification, reference being had therein to the accompanying drawings.

This invention relates to tube mills, employed for the reduction of ore and other substances, and has for its object to provide improved means for supporting and driving the rotating drums or cylinders of these mills, and in which the grinding takes place, as will hereinafter more fully appear.

In the accompanying drawings Figure 1 is a side view of a tube mill embodying the present invention, and Fig. 2 is an end view, partly in section on line 2—2, Fig. 1, of the same. Fig. 3 illustrates a modified form of the invention.

Referring to the drawings, 12 denotes a suitable base on which are mounted standards 13 and 13$^a$, the standard 13 being provided with laterally extending brackets 14. Journaled in suitable bearings (preferably ball or roller anti-friction bearings) supported by the brackets 14 is a driving shaft 15 provided with a pulley 16 which may be belted to any suitable source of power. Journaled in bearings supported by the standards 13 and 13$^a$ are shafts 17 and 17$^a$ carrying sheaves or pulleys 18 and 18$^a$. The driving shaft 15 is provided with a pulley 19 operatively connected with a pulley 20 on the shaft 17, such connection of these shafts 15 and 17 being effected by any suitable means, as by a belt 21, although these shafts may be connected by rope or sprocket gearing, if desired.

Between the standards 13 and 13$^a$ is mounted the rotating drum or cylinder 22 provided with wide annular ribs or flanges each having outer flat faces 23 and a central groove 24. The sheaves or pulleys 18 and 18$^a$ are of similar construction to the annular ribs on the drum or cylinder 22 in that each of the said sheaves or pulleys has two outer flat faces, registering with the flat faces 23 of the said ribs, and a central groove registering with the central groove 24 of the said ribs on the said drum or cylinder. The upper sheaves or pulleys 18 and 18$^a$, the annular ribs or flanges of which run in contact with the ribs or flanges 23 on the drum or cylinder 22, serve as steadying and guiding rolls for said drum or cylinder in that they are in contact with rigid parts of or on said drum or cylinder.

The sheaves or pulleys 18 and 18$^a$ are provided with side flanges 18$^b$ straddling the ribs on the drum or cylinder 22 to prevent endwise movement of the latter, and the said sheaves or pulleys are preferably arranged at a considerable height above the axis or center of rotation of the said drum or cylinder 22. The said drum or cylinder is preferably supported and rotated by endless ropes 25 passing below the said drum or cylinder and above the said sheaves or pulleys 18 and 18$^a$, the said ropes also passing below idler sheaves or pulleys 26 and 26$^a$ arranged below the said drum or cylinder. The idler sheaves or pulleys 26 and 26$^a$ are similar in construction to the sheaves or pulleys 18 and 18$^a$ in that they have outer flat peripheral portions, and central grooves to receive the ropes 25.

By virtue of the arrangement shown of the sheaves or pulleys 18 and 18$^a$, above the axis of the drum or cylinder 22, the driving and supporting ropes 25 (which may be of wire or otherwise) will have angles of contact of considerably more than 180° with the said drum or cylinder, as denoted by the lines $a$, and with the driving sheaves or pulleys 18, as denoted by the lines $b$, these angles of contact, in the arrangement shown, being about 220° in each instance, or an aggregate or total of about 440°. These large angles of contact will insure efficient driving and supporting power for the rotating drum or cylinder 22, as will be understood.

The idler sheaves or pulleys 26 are carried by shafts 27 preferably mounted on ball-bearings at 28 supported from the base 12 in brackets 29 which are horizontally adjustable by means of screws 30. Also the bearings for the shafts 17, carrying the sheaves or pulleys 18, are preferably mounted in brackets 30 adjustably secured to the tops of the standards 13 and adjustable by the screws 31 when the attaching bolts 32 are loosened. By virtue of these adjustments of the sheaves or pulleys 18 and 26, around which the supporting and driving ropes 25 pass, the said ropes may be tightened or loosened, as may be desired.

Instead of providing two idler sheaves or pulleys 26 and 26$^a$ around which the endless ropes 25 or equivalent driving belts pass, a set of idler pulleys 26ᵇ, located centrally beneath the drum or cylinder, may be provided as in the modified form of the invention shown in Fig. 3. The construction shown in Figs. 1 and 2 is, however, preferred, in that the wide flanges on the idler pulleys 26 and 26ᵃ, registering with the flat faces 23 of the annular ribs on the drum or cylinder 22, will serve to support the said drum or cylinder in case the endless driving ropes or belts, which normally sustain the weight of the cylinder, should break.

From the foregoing it will be understood that this invention provides a strong and efficient supporting and driving mechanism of economical construction, for tube mills. The invention is not to be understood as being limited to the details herein shown and described, as any other equivalent flexible supporting driving means may be substituted for the ropes 25, and the relative arrangements of the sheaves or pulleys 18 and 18ᵃ and the drum or cylinder may be varied somewhat without departing from the spirit of the invention. While it is preferred to support the rotary drum or cylinder entirely by the ropes 25 this is not absolutely necessary, as the said drum or cylinder might be supported at one end by a trunnion.

Having thus described my invention I claim and desire to secure by Letters Patent:

1. In a tube mill, the combination with a rotary drum or cylinder, of upper steadying and guiding sheaves or pulleys on opposite sides of said drum or cylinder and running in contact with rigid parts of or on said drum or cylinder, idler sheaves or pulleys below said drum or cylinder, and flexible supporting and driving means passing about all of said sheaves or pulleys and said drum or cylinder.

2. In a tube mill, the combination with a rotary drum or cylinder, of sheaves or pulleys arranged on opposite sides of said drum or cylinder and having their axes above the axis of said drum or cylinder, idler sheaves or pulleys below the said drum or cylinder, and flexible supporting and driving means passing about said sheaves or pulleys and said drum or cylinder and having an angle of contact of more than 180° with the said drum or cylinder.

3. In a tube mill, the combination with a rotary drum or cylinder provided with grooved annular ribs, of upper steadying and guiding sheaves or pulleys on opposite sides of said drum or cylinder and running in contact with rigid parts of or on said drum or cylinder, idler sheaves or pulleys below the said drum or cylinder, and flexible supporting and driving means passing about all of said sheaves or pulleys and said drum or cylinder and between the latter and said upper sheaves or pulleys and having angles of contact of more than 180° with said drum or cylinder and also with said upper sheaves or pulleys, said ribs and sheaves or pulleys having flat peripheral face portions and intermediate grooves.

4. In a tube mill, the combination with a rotary drum or cylinder, of upper steadying and guiding sheaves or pulleys on opposite sides of said drum or cylinder and running in contact with rigid parts of or on said drum or cylinder, idler sheaves or pulleys below the said drum or cylinder, and flexible supporting and driving means passing about all of said sheaves or pulleys and said drum or cylinder and between the latter and said upper sheaves or pulleys and having angles of contact of more than 180° with said drum or cylinder and also with said upper sheaves or pulleys, one or more sets of said sheaves or pulleys being adjustable to tighten or loosen said flexible supporting and driving means.

In testimony whereof I affix my signature.

JULIUS G. BERGMAN.